(12) United States Patent
Foth et al.

(10) Patent No.: US 7,299,198 B2
(45) Date of Patent: Nov. 20, 2007

(54) METHOD FOR RETURNING AND RESELLING MERCHANDISE

(75) Inventors: Thomas J. Foth, Trumbull, CT (US); Cornelius S. McNab, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 878 days.

(21) Appl. No.: 10/285,215

(22) Filed: Oct. 31, 2002

(65) Prior Publication Data
US 2004/0088225 A1 May 6, 2004

(51) Int. Cl.
*G06Q 30/00* (2006.01)
(52) U.S. Cl. .................................................. 705/26
(58) Field of Classification Search .................. 705/26, 705/27, 1, 28, 22
See application file for complete search history.

(56) References Cited

U.S. PATENT DOCUMENTS

| 6,770,831 | B1* | 8/2004 | Rojas et al. | 209/584 |
|---|---|---|---|---|
| 2001/0032147 | A1* | 10/2001 | Siegel | 705/26 |
| 2002/0019785 | A1* | 2/2002 | Whitman | 705/28 |
| 2002/0046056 | A1* | 4/2002 | Demarco et al. | 705/1 |
| 2002/0152174 | A1* | 10/2002 | Woods et al. | 705/60 |
| 2003/0050862 | A1 | 3/2003 | Bleilcken et al. | 705/27 |
| 2003/0225625 | A1* | 12/2003 | Chew et al. | 705/24 |
| 2004/0193438 | A1* | 9/2004 | Stashluk et al. | 705/1 |
| 2005/0259658 | A1* | 11/2005 | Logan et al. | 370/392 |
| 2006/0116923 | A1* | 6/2006 | Woods et al. | 705/13 |

* cited by examiner

*Primary Examiner*—Ronald Laneau
(74) *Attorney, Agent, or Firm*—Ronald Reichman; Angelo N. Chaclas

(57) ABSTRACT

A method is provided for secondary resale of returned merchandise wherein the returned merchandise is preferably indirectly shipped from an original consumer to a secondary consumer after the returned merchandise is rerouted to a secondary consumer via a shipping carrier. An original consumer, upon instructions from a returns facilitator, first ships the merchandise to be returned to a first address, afterwhich the returns facilitator finds a secondary buyer and causes the merchandise to be returned to be rerouted by a shipping carrier so as to be delivered to the secondary consumer.

9 Claims, 3 Drawing Sheets

METHOD FOR RETURNING AND RESELLING MERCHANDISE

I. FIELD OF THE INVENTION

This invention relates to a method for returning merchandise from an original buyer to a retailer for secondary resale by a returns facilitator. More particularly, it relates to a method for reselling returned merchandise, which returned merchandise is indirectly shipped from an original buyer to secondary purchaser of the returned merchandise.

II. BACKGROUND OF THE INVENTION

When an original buyer returns merchandise to particularly a mail-order or online retailer, the original buyer typically must first ship the merchandise back to the retailer (typically with the original buyer paying for the shipping cost), which retailer may or may not directly resell the merchandise. This decision of the retailer to resell the merchandise may be contingent upon the condition of the returned merchandise and whether it was returned in its original packaging and with all of its original enclosure materials. Further contingencies may include whether the returned merchandise is currently being sold by the retailer and/or whether the retailer has ample inventory space for the returned merchandise. In recent studies by third party logistics providers, approximately 60-80% of all returned merchandise is in condition for resale by the original merchant.

In the event the retailer does not resell the returned merchandise, the retailer typically out sources the processing of returned merchandise to a third party logistics provider. This outsourcing step once again involves the shipping of the returned merchandise, wherein this time the returned merchandise is shipped from the retailer to the third party logistics provider for secondary resale by the third party logistics provider. Afterwards, the third party logistics provider preferably inspects the returned merchandise, and then depending upon the condition of the returned merchandise, ships the returned merchandise back to the manufacturer, retailer or to a secondary retailer.

Thus, the above-described process is inefficient as it suffers from several drawbacks. For instance, this process is time consuming as it may involve several shipping routes, with each route necessitating handling and shipping costs. Another drawback is the inclusion of a third party logistics provider, which has its own additional cost and delays associated with it.

Thus it is an object of the present invention to provide an improved method for reselling returned merchandise that overcomes the above-noted inefficient drawbacks of the prior art.

III. SUMMARY OF THE INVENTION

The present invention relates to a method for secondary resale of returned merchandise wherein the returned merchandise is preferably shipped from an original consumer to a secondary consumer, after the returned merchandise is rerouted via a shipping carrier. In other words, the returned merchandise is indirectly shipped from the original consumer to a secondary consumer.

The present invention includes the steps of providing an original consumer having merchandise to be returned, which original consumer communicates with a returns facilitator indicating the original consumer's desire to return merchandise. Preferably, the original consumer provides the returns facilitator with information describing the merchandise to be returned. The returns facilitator then provides the original consumer with shipping information regarding the merchandise to be returned. Preferably, this shipping information includes a shipping address associated with either the returns facilitator or the original merchant from which the merchandise was originally purchased. The original consumer then provides the merchandise to be returned to a shipping carrier so as to be shipped to the aforesaid address provided by the returns facilitator.

Concurrently with the original consumers aforesaid actions, the returns facilitator offers for sale the returned merchandise to a secondary buyer preferably via the internet, telephony or mail. If a secondary buyer is found either prior to, or during the shipping of the returned merchandise, the returns facilitator communicates with the shipping carrier so as to reroute the returned merchandise to an address preferably associated with the secondary buyer.

IV. BRIEF DESCRIPTION OF THE DRAWINGS

The above and other objects of the present invention will be apparent upon consideration of the following detailed description, taken in conjunction with the accompanying drawings, in which like reference numerals refer to like parts throughout, and in which.

V. DETAILED DESCRIPTION OF THE PREFERRED EMBODIMENT

Figure 1:
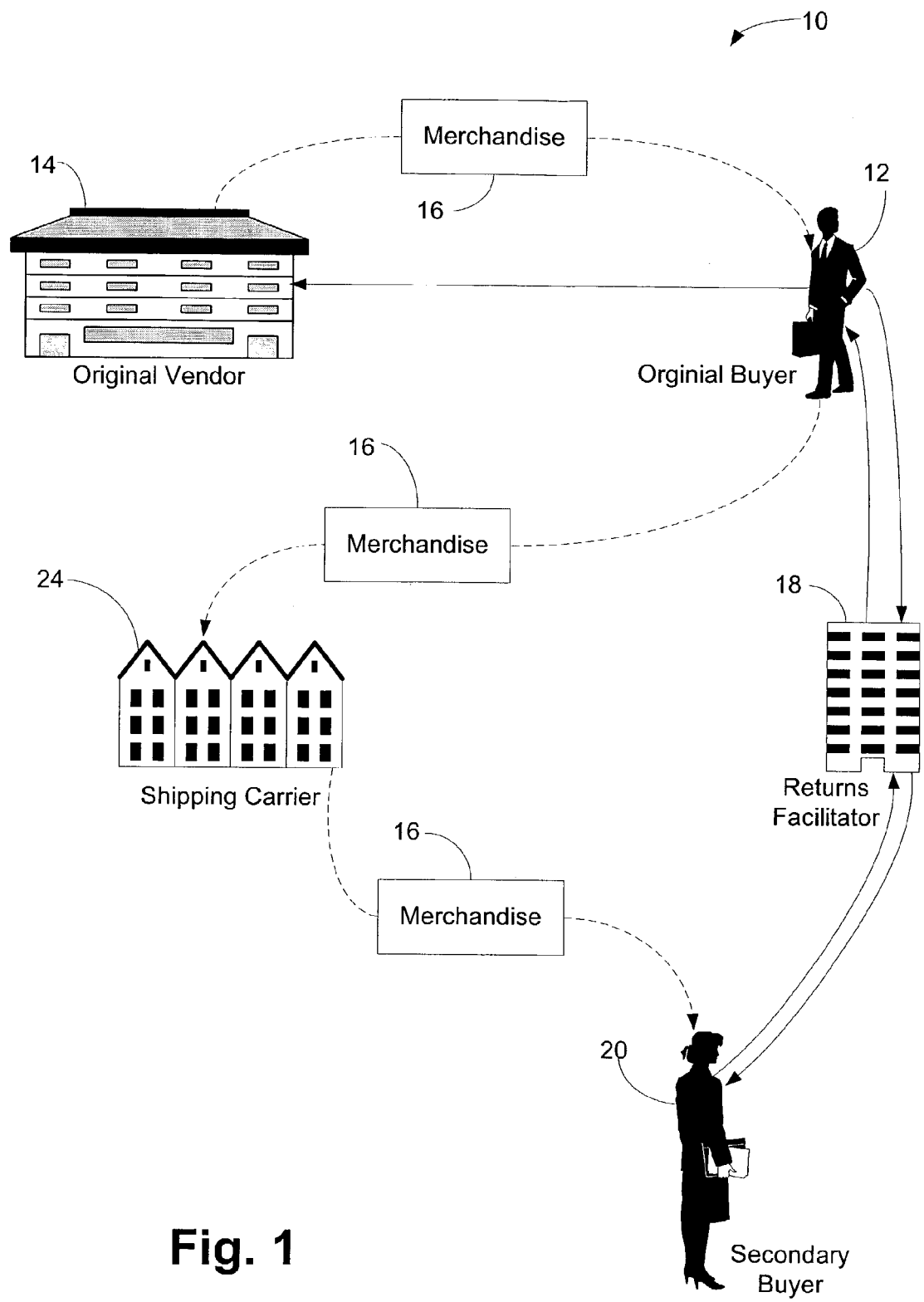
FIG. 1 is a flow diagram depicting the present invention.
Figure 2:
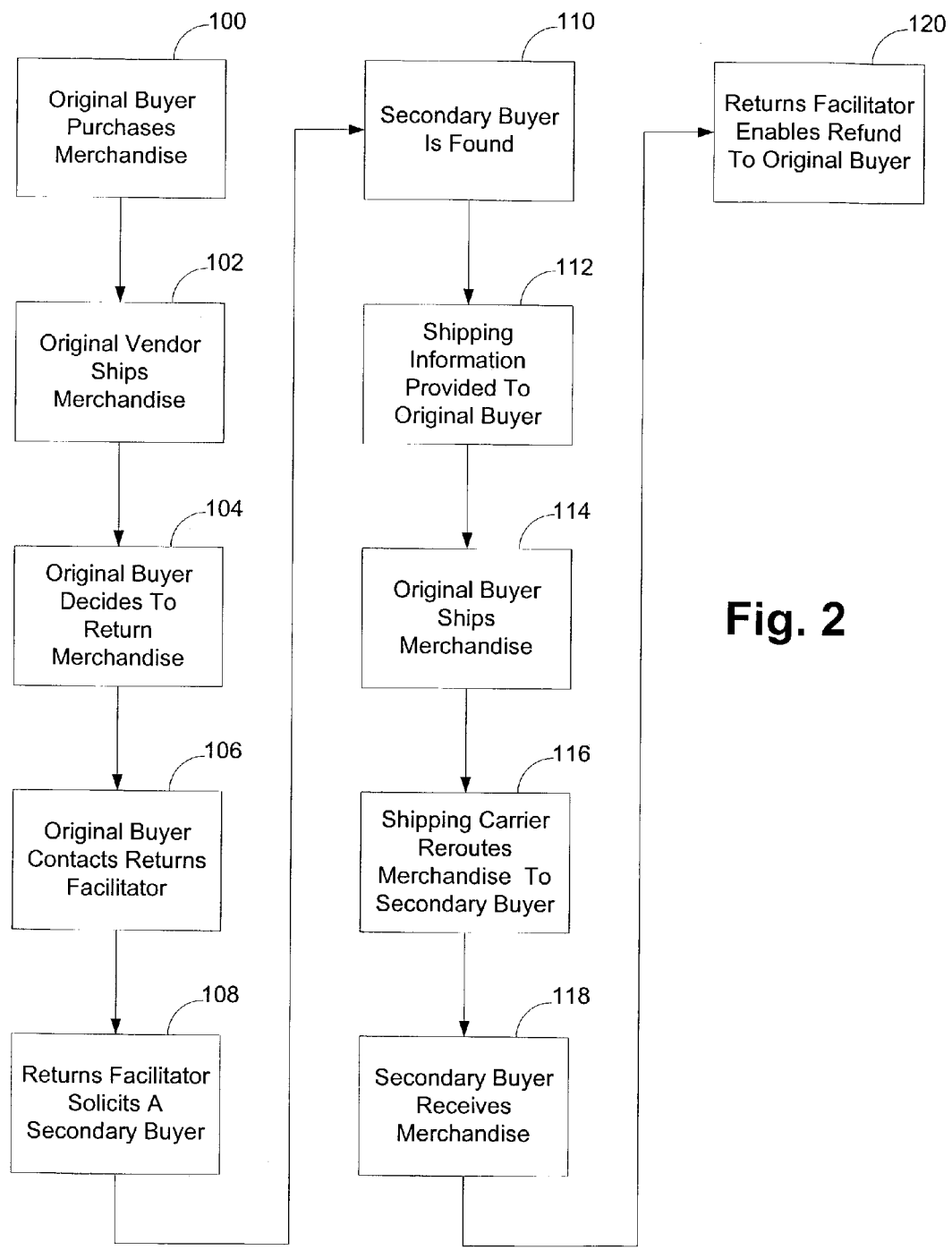
FIG. 2 is a flow chart depicting the method of the present invention.

With reference to FIGS. 1 and 2, there is shown a flow diagram, illustrated generally by reference numeral 10, depicting the present invention in which an original buyer 12 first purchases merchandise 16 from an original vendor 14 (step 100) with the vendor 14 thereafter shipping the purchased merchandise 16 to the buyer 12 (step 102). In accordance with the present invention, this sale is typically performed remotely wherein the vendor 14 is either a mail order vendor or conducts business via the internet (e.g., Amazon.com). The present invention is of course not to be limited to such remote sales but may encompass the situation wherein a buyer physically purchases an item from a retailer (e.g., buyer visits a Sears retail location and purchase merchandise).

In the event the original buyer 12 decides to return the merchandise 16 (step 104), the original buyer 12 contacts a returns facilitator 18 associated with the original vendor 14 (step 106), which returns facilitator 18 is operative to process the returning of the merchandise 16 purchased from the original vendor 14. Preferably, the original buyer 12 provides information describing and/or identifying the merchandise 16 (e.g., product description, invoice number, skew number, etc.) and contacts the returns facilitator 18 via any known means of communication including the intranet, telephony (including facsimile), email and mail.

It is to be appreciated that the returns facilitator 18 may be either integrated "inhouse" with the original vendor 14 or may be a third party relative to the original vendor 14. In the event the returns facilitator 18 is a third party relative to the original vendor 14, it is to be further appreciated that the returns facilitator 18 preferably has similar secondary retail arrangements with a plurality of other vendors.

Afterwards, the returns facilitator 18 makes available for sale the returned merchandise 16 which can be achieved through any known means of advertising or communication (e.g., email, telemarketing, mail, newspaper or periodical advertisements) (step 108). Preferably, in accordance with the present invention, such a secondary sale of the aforesaid original merchandise 16 is accomplished by the returns facilitator 18 via a web page(s) on the internet in which the returns facilitator 18 maintains a web site for listing the secondary sale of the aforesaid returned merchandise 16. A secondary buyer 20 then is able to view the items for secondary sale by the returns facilitator 18 (e.g., preferably via the internet) and choose which merchandise to be returned item to purchase. It is to be appreciated that in accordance with the present invention a secondary buyer 20 may consist of an individual buyer or another retailer.

It is also to be understood that secondary buyers 20 may subscribe to the returns facilitator 18 whereby the secondary buyer 20 creates a "wish list" of items desired by the secondary buyer 20, which wish list is provided to the returns facilitator 18 and contains a description of desired items. The returns facilitator 18 then queries each buyer's wish list to determine if there is a match between the aforesaid returned merchandise items currently offered for sale by the returns facilitator 18 and the items contained in the wish lists provided to the returns facilitator 18 by subscribing secondary buyers 20. If a match is determined by the returns facilitator 18, a message is then preferably provided to the secondary buyer 20 indicating such a potential match, afterwhich the secondary buyer 20 decides whether or not to purchase the returned merchandise item 16. For example, a secondary buyer 20 may create a wish list consisting of: 1) a laptop computer that is less than 7 lbs and has between 128-256 MB of RAM available; and 2) a desktop computer that has a processing speed greater than 2 GHz and has at least 512 MB of RAM. Afterwhich, returned merchandise 16, among other items, consists of a 1) laptop that is 5.2 lbs with 128 MB of RAM; and 2) a desktop having a processing speed 1.3 GHz with 512 MB of RAM is provided for secondary resale by returns facilitator 18. The returns facilitator 18 may then determine a match exists between the aforesaid laptops (and not the desktops) and informs the subscribing secondary buyer 20 (preferably via email) of the aforesaid laptop match. The secondary buyer 20 may then further investigate the laptop offered for sale to decide whether or not to purchase it.

In the event a secondary buyer 20 desires to purchase the returned merchandise item 16 from the reselling facilitator 18, the secondary buyer 20 preferably agrees to the terms and conditions for the secondary resale, which transaction is preferably performed electronically (e.g., via the internet, e-mail or telephony)(step 110). As part of this sale, the secondary buyer 20 preferably provides shipping and payment instructions for the purchased returned merchandise 16. It is to be appreciated that payment can be effected in a number of known methods including check, credit card or third party payment systems, such as Paypal™.

The returns facilitator 18 then provides shipping instructions to the original buyer 12 (step 112). As will be explained in more detail below, the shipping instructions may consist of a shipping address. An electronic label, or a pre-printed shipping label which simply needs to be affixed to the merchandise 16. Once the original buyer 12 has received the shipping instructions, the original buyer 12 then ships the merchandise 16, via the carrier system 24 (as will be explained in more detail below), and in accordance with the aforesaid shipping instructions (step 114). The carrier system 24 then delivers the merchandise and confirms receipt 16 to the secondary buyer 20 (step 116). Once the secondary buyer 20 receives the merchandise 16 from the shipping system 24 (step 118), the secondary buyer 20 preferably inspects the merchandise 16 such that the returns facilitator 18 can then authorize the original vendor 14 to provide the appropriate refund to the original buyer 12 for the returned merchandise 16 (step 120).

Figure 3:
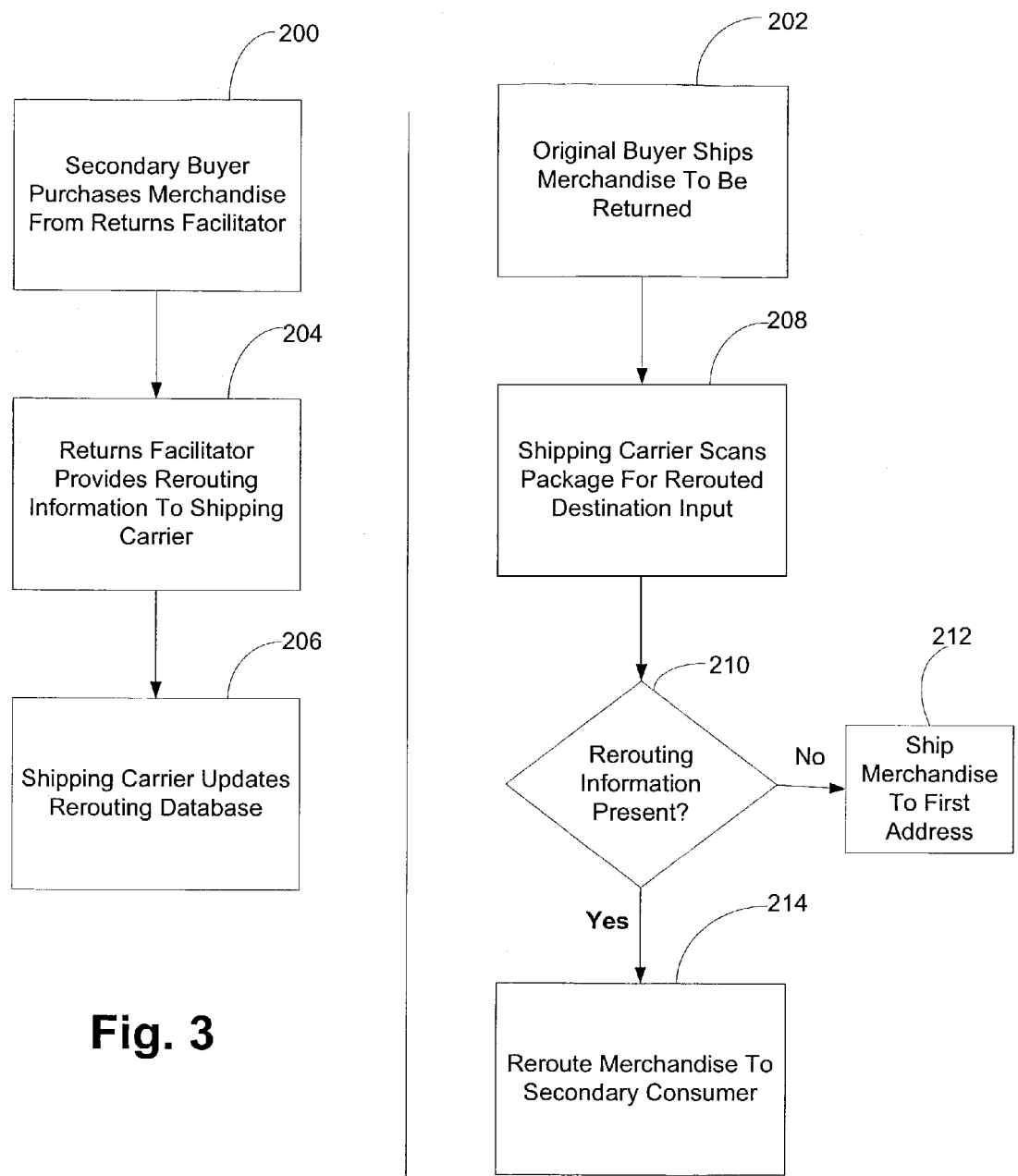
FIG. 3 is a flow chart depicting the merchandise rerouting method of the present invention.

With reference now to FIG. 3, the method for shipping the returned merchandise from the original buyer 12 to the secondary buyer 20, via carrier system 24, will now be described. Once the secondary buyer 20 purchases the returned merchandise 16 from the returns facilitator 18 (step 200), the returns facilitator 18 provides a first shipping address to the original buyer 12 who affixes this first shipping address to the merchandise 16 and ships it (step 202). It is noted that this first shipping address is not the shipping address given by the secondary buyer 20 but rather is a "default address" (any address other than the secondary buyer's given address). Preferably, the default address is an address associated with the original vendor 14, such that the original buyer 12 believes the merchandise 16 is being returned to the original vendor 14 thus preventing abusive usage of the services of the returns facilitator 18. The carrier system 24 that is chosen to deliver the returned merchandise 16 (e.g., U.S.P.S., FedEx, UPS, etc.) is then provided with a rerouting address to be associate with or replace the default address, which rerouting address is the secondary buyer's 20 given shipping address (step 204). The shipping carriers 24 routing database is then update with the aforesaid rerouting address (step 206). It is noted that the aforesaid rerouting information can be encoded in a bar code, planetcode bar code, zip code, or other form of encoding information.

Hence, after the merchandise 16 having default address label is received by the carrier system 24 having the default address, the carrier system 24 scans the default address label (step 208) and determines if there is a rerouting address associated with the default address (step 210). If no, the merchandise is delivered to the default address (step 212). If yes, the merchandise 16 is relabeled by the carrier system 24 with the aforesaid rerouting address (step 214) and is thereafter delivered to the secondary buyer 20.

It is to be understood that in accordance with the present invention, the returned merchandise 16 may be shipped from the original buyer 12 to the default address either 1) already having a secondary buyer 20 associated with it, or 2) not having a secondary buyer associated with the merchandise 16 while it is in the carrier system 24. That is, and with respect to already having a secondary buyer 20, it has been predetermined that the merchandise 16 is to be rerouted by the carrier system 24 to arrive at the secondary buyer's given address.

And with respect to not having a secondary buyer 20, the original buyer 12, after contacting the returns facilitator 18, sends the package to a default address that is preferably an address associated with the original vendor 14, and while the merchandise 16 is in the possession of the carrier system 24, the returns facilitator 18 proceeds to find a secondary buyer for the merchandise 16. If a secondary buyer 20 is found, the carriers 24 routing database is updated with the secondary buyer's given address so as to facilitate delivery of merchandise 16 by the carrier system 24 to secondary buyer 20. It is noted that this enables the returns facilitator 18 to use the carrier system 24 for the returned merchandise 16 as a virtual short term warehouse, whereby the additional shipping costs that will be incurred while the returned merchandise is being processed in the carrier system 24 is still less than that which would be incurred if the original vendor had to first accept delivery of returned merchandise, store the returned merchandise in inventory, and then reship the returned merchandise to a secondary buyer.

And if the returns facilitator 18 does not find a secondary buyer 20, the carrier system 24 simply proceeds to deliver the merchandise to the default address, which is preferably the address of the original vendor 14. It is further noted that rerouting of the merchandise 16 can occur at lease two points in the carrier's 24 system, namely the point of acceptance for the merchandise 16 or at the destination delivery location of the carrier system 24.

Thus, the present invention is advantageous in that it eliminates unnecessary shipping of the returned merchandise and the need for costly and inefficient third party logistics processes.

In summary, a method for reselling returned merchandise has been described. Although the present invention has been described with emphasis on a particular embodiment, it should be understood that many changes and modifications may be made to the invention without departing from the scope and spirit of the invention as disclosed. For example, many modifications and adaptations to the preferred embodiment will be apparent to those skilled in the art. Further, those skilled in the art will appreciate that some aspects of the present invention will be used to advantage without the corresponding use of other aspects.

Accordingly, the foregoing description of the preferred embodiment should be considered as merely illustrative of the present invention and not in limitation thereof.

What is claimed is:

1. A method for secondary resale of merchandise comprising the steps of:

providing a first consumer having merchandise to be returned;

communicating information from said first consumer to a returns facilitator indicating data relevant to said merchandise to be returned;

communicating information from said returns facilitator to said first consumer indicating a predetermined first shipping address;

offering for sale said returned merchandise to potential secondary buyers by said returns facilitator based at least in part on said data relevant to said merchandise to be returned;

shipping said returned merchandise by said first consumer to said first shipping address via a shipping carrier;

communicating information from said returns facilitator to said shipping carrier indicating a second address associated with said secondary buyer in the event said secondary buyer purchases said merchandise from said returns facilitator; and rerouting said returned merchandise to said second address by said shipping carrier in the event said second address is provided to said shipping carrier while said returned merchandise is in possession of said shipping carrier.

2. A method for secondary resale of merchandise as recited in claim 1 further including the step of:

purchasing by said secondary buyer of said merchandise to be returned, wherein the secondary buyer provides the returns facilitator with at least a said second address.

3. A method for secondary resale of merchandise as recited in claim 2 wherein the purchasing step includes the step of the secondary buyer purchasing said merchandise to be returned from the group consisting of: internet, telephony and mail.

4. A method for secondary resale of merchandise as recited in claim 1 further including the steps of:

creating a list of desired items by a said secondary buyer;

providing said list of desired items to said returns facilitator prior to said returns facilitator receiving said data relevant to said merchandise to be returned; and comparing said list of desired items with said merchandise to be returned to determine if a match exists between said list of desired items and said merchandise to be returned.

5. A method for secondary resale of merchandise as recited in claim 1 wherein the communicating information from said first consumer to a returns facilitator step includes the step of communicating from the group consisting of: mail, internet and telephony.

6. A method for reselling merchandise as recited in claim 1 wherein the offering for sale step includes the step of using the internet for offering for sale said merchandise to be returned.

7. A method for reselling merchandise as recited in claim 1 wherein the offering for sale step includes the step of communicating from the group consisting of: internet, mail and telephony.

8. A method for reselling merchandise as recited in claim 1 wherein said first address is an address associated with said returns facilitator or said original vendor.

9. A method for reselling merchandise as recited in claim 1 wherein the offering for sale step includes finding said secondary buyer for said merchandise to be returned while said merchandise to be returned is in possession of said shipping carrier while being shipped to said first address.

* * * * *